United States Patent [19]

Morell et al.

[11] Patent Number: 5,822,716
[45] Date of Patent: Oct. 13, 1998

[54] SYSTEM AND METHOD FOR GENERATING BILLS OF LADING FOR LIQUID COMMODITY SHIPMENTS

[75] Inventors: Tricia L. Morell, Blaine; Linda A. Holman, Bellingham; Bonnie S. Fredeen; Valerie L. Bash, both of Ferndale; Sid T. Agnew, Everson; L. Gene Cline, Custer; Joseph B. Joshua, III, Ferndale, all of Wash.

[73] Assignee: Atlantic Richfield Company, Los Angeles, Calif.

[21] Appl. No.: 684,731

[22] Filed: Jul. 22, 1996

[51] Int. Cl.⁶ .......................... G01G 19/00; G01G 19/02
[52] U.S. Cl. .................... 702/55; 702/24; 73/19.01; 73/149; 364/528.16
[58] Field of Search ..................... 364/509, 506, 364/505, 496, 400, 567, 557, 571.03; 395/185.01, 651, 652, 712, 800

[56] References Cited

U.S. PATENT DOCUMENTS

| | | | |
|---|---|---|---|
| 4,605,081 | 8/1986 | Helmly, Jr. et al. | 364/567 |
| 4,949,288 | 8/1990 | Bookout | 364/558 |
| 5,000,357 | 3/1991 | Shannon et al. | 22/129.1 |
| 5,010,761 | 4/1991 | Cohen et al. | 73/40.7 |
| 5,168,444 | 12/1992 | Cukor et al. | 705/1 |
| 5,305,237 | 4/1994 | Dalrymple et al. | 364/562 |
| 5,383,113 | 1/1995 | Kight et al. | 364/401 |

*Primary Examiner*—Emanuel Todd Voeltz
*Assistant Examiner*—Cuong H. Nguyen
*Attorney, Agent, or Firm*—Sheldon & Mak

[57] ABSTRACT

The present invention is a computer system and a method using a computer for generating a bill of lading describing a liquid commodity shipment. A central processing unit operates on program instructions and comprises processor means and a main memory. A database is connected to the central processing unit over a bus and stores information pertaining to shipment containers to be delivered and filled for shipment of the liquid commodity. A computer program is stored in the main memory and comprises program instructions for determining compliance with predetermined conditions of shipment of the liquid commodity over a regulated transportation surface. Means for generating a bill of lading using the processing means operate on program instructions using the stored information.

11 Claims, 13 Drawing Sheets

Burlington Northern Railroad

From: ARCO PRODUCTS COMPANY
At:  ARCO, WA STATION 66604
Ship To: FER
Care of:

Date: 5/17/95
BOL Number: 100181
LP Number:
Cust Order #

Rail Dest: WALLA WALLA  WA
Ult. Dest:
Route: BN
Send Freight Bill To:  Dely:
   A2553   COLLECT
   SECTION 7 SIGNED
   Contract #:
   Beyond Contract #:

DESCRIPTION OF ARTICLES:
   LOAD TKR (See Gallons Below)
   FLAMMABLE GAS LIQUIDS
   2.1
   UN1075
   PLACARDED:   FLAMMABLE GAS
   EMERGENCY CONTACT:   000-000-0000
   HAZMAT STCC = 4905760   (ISO Butane)
   Canadian ERP:   Canadian ERP PHONE:

AGREEMENT WEIGHTS

| Init/No. | Outages In. Gals | Weight Gross Ttl. Gals. | Seal No. | Table No. S.P. Gravity At 60F | Temp F | Shell Cap In Gals. Net Gals Shipped @ 60 F | Wt. per Gal |
|---|---|---|---|---|---|---|---|
| RCOX005137 |  | 146086 | 111 | RCOX5137 |  | 33562 |  |
|  | 15  2511 | 31051 |  | 0.563 | 59 | 33562 | 4.7 |
| UTLX088453 |  | 148302 | 222 | UTLX01193 |  | 33980 |  |
|  | 15  2458 | 31522 |  | 0.563 | 59 | 31554 | 4.7 |
| UTLX093560 |  | 148052 | 333 | UTLX1193 |  | 33927 |  |
|  | 15  2458 | 31469 |  | 0.563 | 59 | 31500 | 4.7 |

Waybill Comments:

This is to certify that the above-named materials are properly classified, described, packaged, marked and labeled, and are in proper condition for transportation according to the applicable regulations of the department of transportation:

Hiram Clark

Burlington Northern STATUS: Created   Date: (YRMODY) Time: (PACIFIC)

*Fig. 7*

CARS READY TO SHIP

[SORT BY CAR #] [SORT BY DATE LOADED] [RETURN TO MAIN FORM]

| CAR NUMBER | DATE LOADED | DATE IN YARD | PRODUCT | INCHES | CAR SEAL # | GRAV | TEMP | TANK |
|---|---|---|---|---|---|---|---|---|
| ACFX017322 | 8/3/95 | 8/3/95 | PROPANE | 14 | 11111 | 0.495 | 74 | 61 |
| ACFX019951 | 8/3/95 | 8/3/95 | PROPANE | 14 | 22222 | 0.495 | 74 | 61 |
| GATX012113 | 8/3/95 | 8/3/95 | PROPANE | 14 | 33333 | 0.495 | 74 | 61 |
| GATX019530 | 8/3/95 | 8/3/95 | MIXED BUTANE | 15 | 12345 | 0.576 | 74 | 60 |
| GATX026756 | 8/3/95 | 8/3/95 | PROPANE | 14 | 44444 | 0.495 | 74 | 61 |
| RCOX005104 | 8/3/95 | 8/3/95 | MIXED BUTANE | 15 | 54321 | 0.576 | 74 | 60 |
| UTLX037706 | 8/3/95 | 8/3/95 | PROPANE | 14 | 55555 | 0.495 | 74 | 61 |

RECORD: 1 OF 7

Fig. 11C

SHIPPING HISTORY     CAR NUMBER [GATX019530]     [RETURN TO MAIN FORM]

| DATE LOADED | IN YARD | SHIPPED | PRODUCT | DESTINATION | REMARKS |
|---|---|---|---|---|---|
| 9/26/94 | 9/27/94 | 10/11/94 | ISO BUTANE | | |
| 10/6/94 | 10/6/94 | 10/11/94 | ISO BUTANE | | |
| 10/17/94 | 10/27/94 | 12/21/94 | MIXED BUTANE | GATX SHOP | |
| 8/3/95 | 8/3/95 | 8/3/95 | MIXED BUTANE | CENTENNIAL GAS LIQUIDS | |
| | '95 3:30:59PM | | | | |

RECORD: 5 OF 5
RECORD: 201 OF 1408

Fig. 11D

```
┌─────────────────────────────────────────────────────────────────┐
│ —        MICROSOFT ACCESS – [ADD FILLING FACTORS]          ▼ ▲  │
│ — FILE EDIT VIEW RECORDS WINDOW HELP                          ▲ │
│    ADD FILLING FACTORS    [ RETURN TO MAIN FORM ]               │
│                           [    DATA ENTRY      ]                │
│  ▶   SEASON CODE    [        1]  1 FOR 11/1 THROUGH 3/31, OTHERWISE 2
│      SPECIFIC GRAVITY [       0]                                │
│      FILLING FACTOR   [       0]                                │
│                                                                 │
│                                                                 │
│                                                                 │
│                                                                 │
│                                                                 │
│                                                                 │
│                                                                 │
│                                                                 │
│ ◄◄ ◄ RECORD:|1    |OF 283   ▶ ▶|                                │
└─────────────────────────────────────────────────────────────────┘
```

*Fig. 11G*

```
┌─────────────────────────────────────────────────────────────────┐
│ —         MICROSOFT ACCESS – [CONSIGNEE]                   ▼ ▲  │
│ — FILE EDIT VIEW RECORDS WINDOW HELP                          ▲ │
│   CONSIGNEE   [FIND CONSIGNEE]  [DATA ENTRY]  [RETURN TO MAIN FORM]│
│ ▶ LP NO. FOR PRODUCTS OTHER THAN ISO:[       ] LP NO. FOR ISO ONLY:[     ]│
│   RULE 11: ☐ CUSTOMER ORDER NO:[       ]                        │
│   FIRST CONTRACT NO[      ] SECOND CONTRACT NO[     ] SECOND CONTRACT RR:[   ]│
│                                                                 │
│   CONSIGNEE:  [GATX SHOP       ]                                │
│   CONSIGNEE CAR OF:  [          ]                               │
│   CONSIGNEE ADDRESS: [          ]                               │
│   CONSIGNEE RAIL DEST:[WEST COLTO] STATE:[CA]                   │
│   ULTIMATE DESTINATION:[        ]  STATE:[  ]                   │
│                                                                 │
│   RAILROAD 1:[BN  ] JUNCTION 1:[PORTL] RAILROAD 2:[SP ] JUNCTION 2:[   ]│
│   RAILROAD 3:[    ] JUNCTION 3:[     ] RAILROAD 4:[   ] JUNCTION 4:[   ]│
│   RAILROAD 5:[    ] JUNCTION 5:[     ] RAILROAD 6:[   ] JUNCTION 6:[   ]│
│   RAILROAD 7:[    ] DELIVERY RAILROAD [        ]                │
│                                                                 │
│   PREPAID OR COLLECT [PP]                                       │
│   IF FREIGHT CHARGES ARE TO BE PAID BY OTHER THAN SHIPPER/CONSIGNEE│
│        PATRON CODE:  [A2553 ]                                   │
│ ◄◄ ◄ RECORD:|1    |OF 24   ▶ ▶|                                 │
└─────────────────────────────────────────────────────────────────┘
```

*Fig. 11H*

|  | MICROSOFT ACCESS - [ADD OUTAGE TABLE] |  |  |  |
|---|---|---|---|---|
|  | FILE EDIT VIEW RECORDS WINDOW HELP |  |  |  |
|  | ADD OUTAGE TABLE | | RETURN TO MAIN FORM | |
|  | OUTAGE INDEX | OUTAGE INCHES | GALLONS DATA ENTRY | FOR EACH INDEX, YOU MUST ADD 1 ENTRY FOR "ZERO" IN AND "ZERO" GALS |
| ▶ | ACFX1360 | 0 | 0 | |
|  | ACFX1360 | 15 | 2627 | |
|  | ACFX1360 | 16 | 2879 | |
|  | ACFX1360 | 17 | 3143 | |
|  | ACFX1360 | 18 | 3143 | |
|  | ACFX1360 | 19 | 3686 | |
|  | ACFX1360 | 20 | 3963 | |
|  | ACFX1360 | 21 | 4245 | |
|  | ACFX1360 | 22 | 4539 | |
|  | ACFX1360 | 23 | 4837 | |
|  | ACFX1360 | 24 | 5137 | |
|  | ACFX1413 | 0 | 0 | |
|  | ACFX1413 | 13 | 2142 | |
|  | ACFX1413 | 14 | 2396 | |

*Fig. 11I*

ADD PRODUCTS

RETURN TO MAIN FORM
DATA ENTRY

PRODUCT CODE: 1
PRODUCT NAME: MIXED BUTANE
POUNDS PER GALLON: 4.8
PROPER SHIPPING NAME: FLAMMABLE GAS
STCC CODE: 4905788
HAZARDOUS CLASS: 2.1
PLACARDED: FLAMMABLE GAS
UN/NA: UN1075

| STATUS | CAR NUMBER | CAR TYPE | TANK | CAR OWNER | PRODUCT | DATE IN YARD | DATE IO |
|---|---|---|---|---|---|---|---|
| FULL,READY TO SHIP | ACFX019951 | PROPANE | | AMERIGAS | PROPANE | 8/3/95 | 8/3/95 |
| FULL,READY TO SHIP | GATX012113 | PROPANE | | AMERIGAS | PROPANE | 8/3/95 | 8/3/95 |
| FULL,READY TO SHIP | GATX019530 | EITHER/OR | | ARCO | MIXED BUTANE | 8/3/95 | 8/3/95 |
| FULL,READY TO SHIP | GATX026756 | BUTANE | | SHELL | PROPANE | 8/3/95 | 8/3/95 |
| FULL,READY TO SHIP | RCOX005104 | EITHER/OR | | ARCO | MIXED BUTANE | 8/3/95 | 8/3/95 |
| FULL,READY TO SHIP | UTLX037706 | BUTANE | | SHELL | PROPANE | 8/3/95 | 8/3/95 |
| | | | 0 | 0 | | '95 1:47:32PM | |

INVENTORY OF CARS ON SITE  SV TEST  [PRINT]  [RETURN TO MAIN FORM]

RECORD: 1 OF 6

Fig. 12D

MICROSOFT ACCESS - [FORM: FILLING CALCULATIONS FORM]

CAR NUMBER: ACFX017322  PRODUCT: PROPANE  [RETURN TO MAIN FORM]
OUTAGE INCHES: 14  SPECIFIC GRAVITY: .495
AMBIENT TEMP: 74

[CALCULATE]  ALLOWABLE GALLONS LOADED: 31231  ACTUAL NET GALLONS: 30478

RECORD: 1 OF 1408

SYSTEM AND METHOD FOR GENERATING BILLS OF LADING FOR LIQUID COMMODITY SHIPMENTS

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

FIELD OF THE INVENTION

The present invention relates in general to a system and method for generating bills of lading, and in particular, to a system and method for generating bills of lading for liquid commodity shipments.

BACKGROUND OF THE INVENTION

A bill of lading is a written document evidencing the receipt of a commodity for shipment by a commercial carrier issued by a consignor of goods. It provides notice to the commercial carrier and written confirmation of the shipment to the consignee. When the commodity shipment is transported in interstate commerce, government agency regulations require a bill of lading to physically accompany each vehicle used to haul the shipment. As a result, a bill of lading must be generated before any shipment can be dispatched and the shipment will be delayed until the bill of lading is delivered to the vehicle.

In the field of shipment by rail of liquid commodities, such as liquid petroleum gas products, a further delay is caused by an overload check requirement. Applicable regulations require that loaded railroad tank cars not exceed certain weight limits as specified in volumetric units, such as gallons. Thus, the weight of each loaded tank car must be checked to determine whether it is within allowable limits for the particular type of tank car used when loaded with the particular type of liquid commodity being shipped. The weight must be adjusted based on individual tank car attributes and factors affecting the characteristics of the liquid commodity being shipped. Only after the overload check has been performed can a bill of lading be generated.

One method for generating a bill of lading involves manually collecting tank car loading information and calculating the overload weights. First, a shipping clerk determines the number and kinds of tank cars required. In the field, operators load the tank cars and convey the loading information back to the shipping clerk. The information is consolidated and the weight characteristics of the liquid commodity are adjusted to account for changes due to seasonal differentials. The overload weights are then calculated and assembled into final bills of lading.

This method has several drawbacks. First, there is the potential for human clerical errors during each manual step. Second, the method is time consuming and requires reference to numerous trade books, manuals and printouts describing the various attributes of the shipping containers and factors affecting the characteristics of the liquid commodities. Finally, there is no provision for the operators in the field to determine whether the load is maximized since it would be impracticable for them to perform calculations during the loading process due to the number of variables involved.

Therefore, there is a need for a system and method for generating a bill of lading for a liquid commodity shipment that enables a consignor to certify that the commodity is within weight limits based on variable factors yet allows an operator to maximize the loading of a tank car in the field.

SUMMARY OF THE INVENTION

The present invention enables the above problems to be overcome by providing a system and method for generating bills of lading for liquid commodity shipments.

An embodiment of the present invention is a computer system for generating a bill of lading describing a liquid commodity shipment. A central processing unit operates on program instructions and comprises processor means and a main memory. A database is connected to the central processing unit over a bus and stores information pertaining to shipment containers to be delivered and filled for shipment of the liquid commodity. A computer program is stored in the main memory and comprises program instructions for determining compliance with predetermined conditions of shipment of the liquid commodity over a regulated transportation surface. Means for generating a bill of lading using the processing means operates on program instructions using the stored information.

An embodiment of the present invention is also a method using a computer for generating a bill of lading describing a liquid commodity shipment. The computer comprises a central processing unit, an input device in communication with the central processing unit and a database accessible by the central processing unit for storing information pertaining to a shipment container to be delivered and filled for shipment of a liquid commodity. A transportable shipment container is delivered and filled with a liquid commodity for shipment over a regulated transportation surface. Instructions concerning the liquid commodity shipment are received with the input device. The received instructions are analyzed using the central processing unit to determine compliance with predetermined conditions of shipment of the liquid commodity over the regulated transportation surface. The bill of lading is generated based on the stored information corresponding to the shipment container in combination with the received instructions.

An embodiment of the present invention is also a method using a computer for generating a bill of lading describing a liquid commodity shipment. The computer comprises temporal logic and a database for storing shipment container attributes and liquid commodity factors. A liquid commodity is loaded into a transportable shipment container up to a predetermined inside height of the shipment container for hauling over a regulated transportation surface. Volumetric units of the liquid commodity actually loaded into the shipment container are determined based on the predetermined inside height, the stored container attributes corresponding to the shipment container and the stored liquid container commodity factors. At least one of the corresponding stored container attributes is automatically corrected to adjust for seasonal differentials using the temporal logic. Volumetric units of the liquid commodity allowed over the transportation surface are determined based on the corresponding stored container attributes, the stored commodity factors and the corrected container attribute. The actual volumetric units are compared to the allowable volumetric units. A bill of lading for the liquid commodity shipment is generated using output means when the actual volumetric units do not exceed the allowable volumetric units.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modifications in various obvious respects, all without departing from the spirit and the scope of the present invention. Accordingly, the drawings and the detailed description are to be regarded as illustrative in nature and not as restrictive.

BRIEF DESCRIPTION OF THE DRAWINGS

FIG. 7 is an example of a bill of lading generated according to the present invention;

FIGS. 11A–K are depictions of screens of the accounting screen hierarchy of FIG. 8; and FIGS. 12A–D are depictions of the operations screen hierarch of FIG. 10.

DETAILED DESCRIPTION

The present invention relates to a system and method for generating a bill of lading for a liquid commodity shipment. The contents of a bill of lading are prescribed by the Uniform Commercial Code. To be valid, a bill of lading must describe the freight commodity so as to properly identify it. It must also state the name of the consignor, the terms of the contract for carriage, and agree or direct that the freight be delivered to the order of assigns of a specified person at a specified place. Finally, it must certify that the freight commodity is properly classified, described, packaged, marked and labeled and is in a proper condition for transportation according to the applicable government agency regulations.

Figure 1:
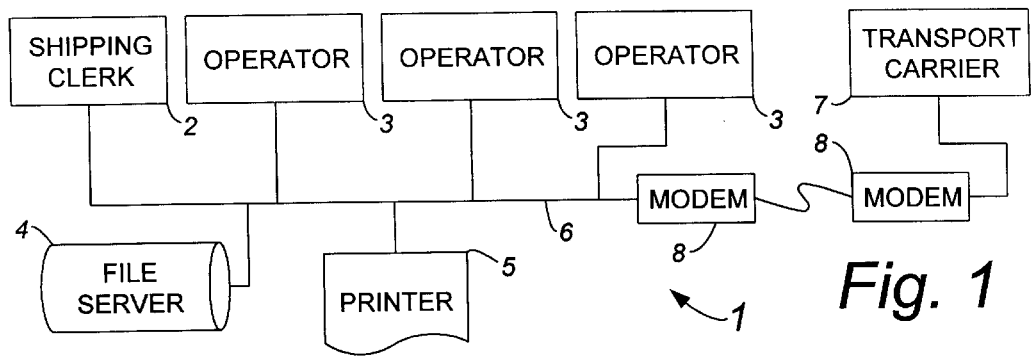
FIG. 1 is a functional block diagram of a computerized environment for generating a bill of lading according to the present invention.

A computing environment in which the present invention can be practiced is shown in the functional block diagram in FIG. 1. A shipping clerk is primarily responsible for the generation of the bills of lading. These are generated from the shipping clerk station 2. Operators are located in the field and are responsible for filling up the tank cars. Preferably, the liquid commodity for shipment is a liquid petroleum gas product, such as liquid butane or propane.

The operators enter the filling information at operator stations 3. A file server 4 is used to collectively maintain tables in a database of the filling information, railcar container attributes, such as shell capacity, outage indices and outage inches, and liquid commodity factors, such as specific gravity and temperature correction factors. The file server 4 is accessible by both the shipping clerk station 2 and the operator stations 3. The shipping clerk station 2, operator stations 3, file server 4 and network printer 5 are also interconnected over a local area network (LAN) 6. A transport carrier station 7 maintained at the location of the commercial carrier can be accessed over the LAN 6 using modems 8.

Figure 2:
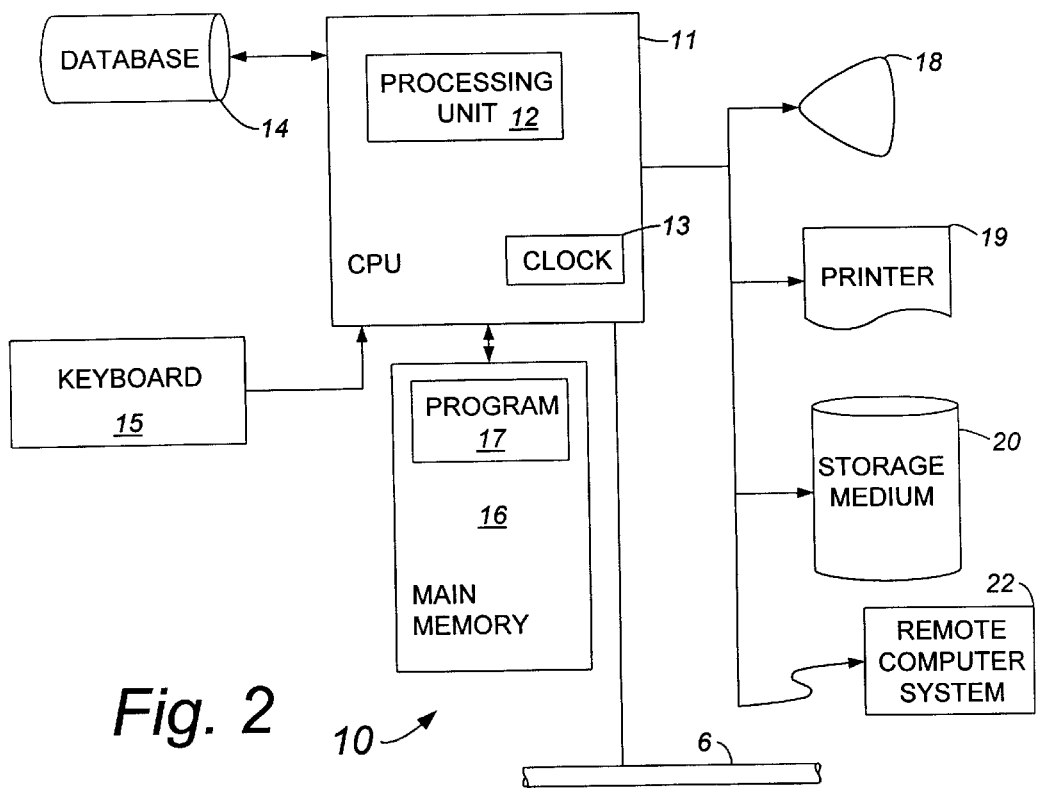
FIG. 2 is a functional block diagram of a computer system according to the present invention.

FIG. 2 shows a functional block diagram of a computer system 10 embodying the present invention which is accessible by a shipping clerk or operators at the shipping clerk station 2 or the operator station 3 of FIG. 1, respectively. A central processing unit (CPU) 11 operates on program instructions using processing unit 12. The CPU 11 also has a clock/calendar logic circuit 13 for maintaining an internal time/date clock. A database 14 for storing information pertaining to shipment containers, including shipment container attributes and liquid commodity factors, is connected to the CPU 11 over a bus. The database 14 can be located on the file server 4 over the LAN 6 or local to the CPU 11. A keyboard 15 receives instructions from its operator concerning the liquid commodity shipment and is in communication with the CPU 11.

A main memory 16 stores a computer program 17 containing program instructions for determining compliance with predetermined conditions. One such condition is whether the tank cars are overloaded for shipment. Another condition is determining how full a tank car can be filled without overfilling.

The computer system 10 can generate a bill of lading in several mediums. A bill of lading can be visually displayed on a monitor 18 or printed using a local printer 19 (or network printer 5). Also, the bill of lading can be stored in storage medium 20, such as a hard drive, as a flat computer file for tabularly representing the bill of lading. Finally, it can be electronically transmitted to a remote computer system 22 using a modem or other similar device. The computer system 10 is interconnected to the LAN 6.

An exemplary example of a workstation suitable for embodying computer system 10 is an IBM PS/2 microcomputer equipped with an 80486 microprocessor running at 50 Mhz, manufactured by International Business Machines Corporation, Armonk, N.Y. Such a system is preferably equipped with at least 8 megabytes of random access memory and a 60 megabyte hard drive. The system preferably runs an operating system such as MS-DOS 6.0 or higher and uses the Windows™ operating environment, version 3.11, and Access database management system, version 2.0. MS-DOS, Windows™ and Access are manufactured by Microsoft Corporation, Redmond, Wash. A suitable local area network operating system is manufactured by Novell, Provo, Utah.

Figure 3:
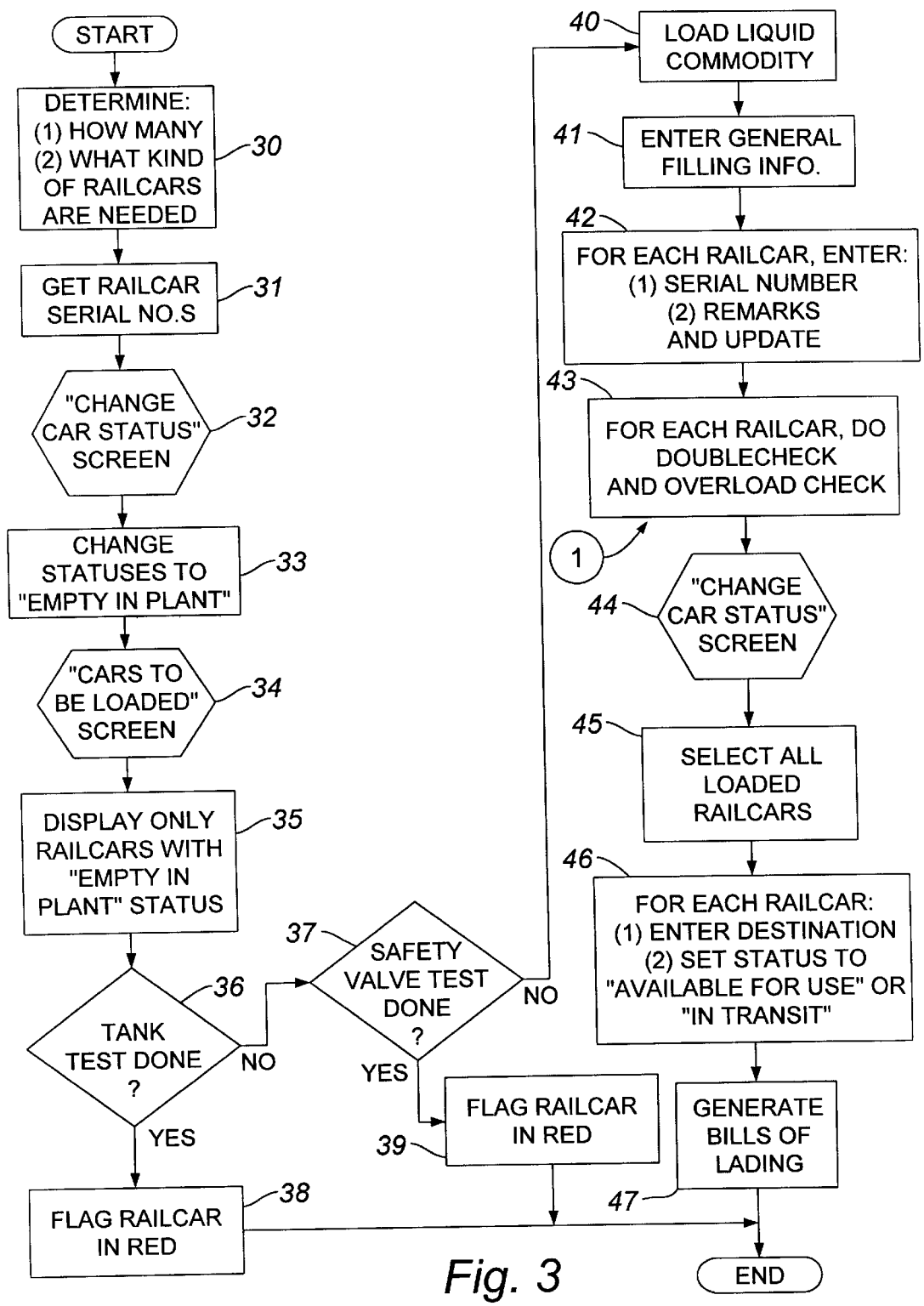
FIG. 3 is a flow diagram of a method according to the present invention.

A flow diagram of a method for generating a bill of lading according to the present invention is shown in FIG. 3. The shipping clerk determines how many and what kind of railroad tank cars are needed to be brought inside the factory and filled for shipment of a specified quantity of a liquid commodity (block 30). The railroad obtains the serial numbers of the available tank cars and provides them to the shipping clerk (block 31).

The shipping clerk accesses the "Change Car Status" screen at the shipping clerk station 2 (block 32). For each of the selected tank cars, its status is changed to "Empty, In Plant" in the database.

In the field, an operator accesses the "Cars To Be Loaded" screen at one of the operator stations 3 (block 34). The screen only displays those tank cars with a status set to "Empty, In Plant" (block 35). Each tank car record also contains a safety indicator for representing the status of its safety inspections which can be either a tank integrity test (block 36) or a safety valve test (block 37). If either of the tests are required through the current year, the safety indicator is displayed in red (blocks 38 and 39). The operator indicates that any tank car with a red safety indicator is not loaded. Otherwise, the operator loads the liquid commodity into the tank car (block 40) up to a predetermined height equaling the outage inches for that particular type of tank car. The operator enters the general filling information into the operator station 3 (block 41) which can also determine how full the tank car can be filled without overfilling. For each tank car, the operator enters a car seal number and remarks and updates the database record accordingly (block 42).

When the loading operation is complete, the operator performs an overload check and the shipping clerk double checks the overload check for all the tank cars as described hereinbelow to ensure that no tank car is overloaded (block 43). It is critical that an accurate determination of the actual loaded weight is made. Railroads are a regulated transportation system and maximum weight allowances are set for safety reasons, to minimize wear and tear on the rails and to ensure compliance with government agency regulations.

When the overload check is complete, the shipping clerk selects the "Change Car Status" screen at the shipping clerk station 2 (block 44). All loaded tank car records are selected from the database (block 45). For each tank car, the shipping clerk enters its destination and sets its status to either "Available For Use" or "In Transit" (block 46).

The shipping clerk then generates bills of lading (block 47) for the tank cars. Preferably, the bills of lading are printed by customer and product identification. In addition, a flat computer file can be created for tabularly representing the bills of lading, preferably in a spreadsheet format, and is transmitted electronically to a remote system located at the railroad's office.

The weight of the liquid commodity actually loaded into each tank car is determined inferentially by multiplying volume in gallons times specific gravity. This weight is dependent upon several factors. One factor is the shell capacity of the tank container itself. Each tank car is unique and has a different shell capacity depending on its manufacturer measured in gallons.

A second factor is the outage inches for the particular load. Each tank car is filled up to a predetermined height from the top of the tank leaving a gap of several inches, typically between 12 and 20 inches, known as the outage inches. This allows room for volumetric changes as the temperature of the liquid commodity increases or decreases while the tank car travels through extremes in climate. In addition, the outage inches must be converted into volumetric units as a function of a particular type of tank car. Like shell capacity, the volume of the outage inches varies depending on the manufacturer of the tank car. The present system stores an outage index with each particular tank car record in the database that corresponds to outage inches measured in gallons.

A third factor is the temperature correction factor. The various seasons effect the ambient temperature which effects the specific gravity of the liquid commodity which in turn effects its volume. For example, when the seasonal temperature increases, the specific gravity of the liquid commodity decreases and it thereby occupies an increased volume.

The actual weight of the loaded liquid commodity is compared to the allowable weight. The determination of the allowable weight requires a further factor, called the filling factor, which accounts for seasonal differentials in the maximum allowed volume of a particular type of liquid commodity. A clock/calendar logic circuit is used to determine the current month so that the filling factor can be automatically corrected.

Figures 4, 5, 6:
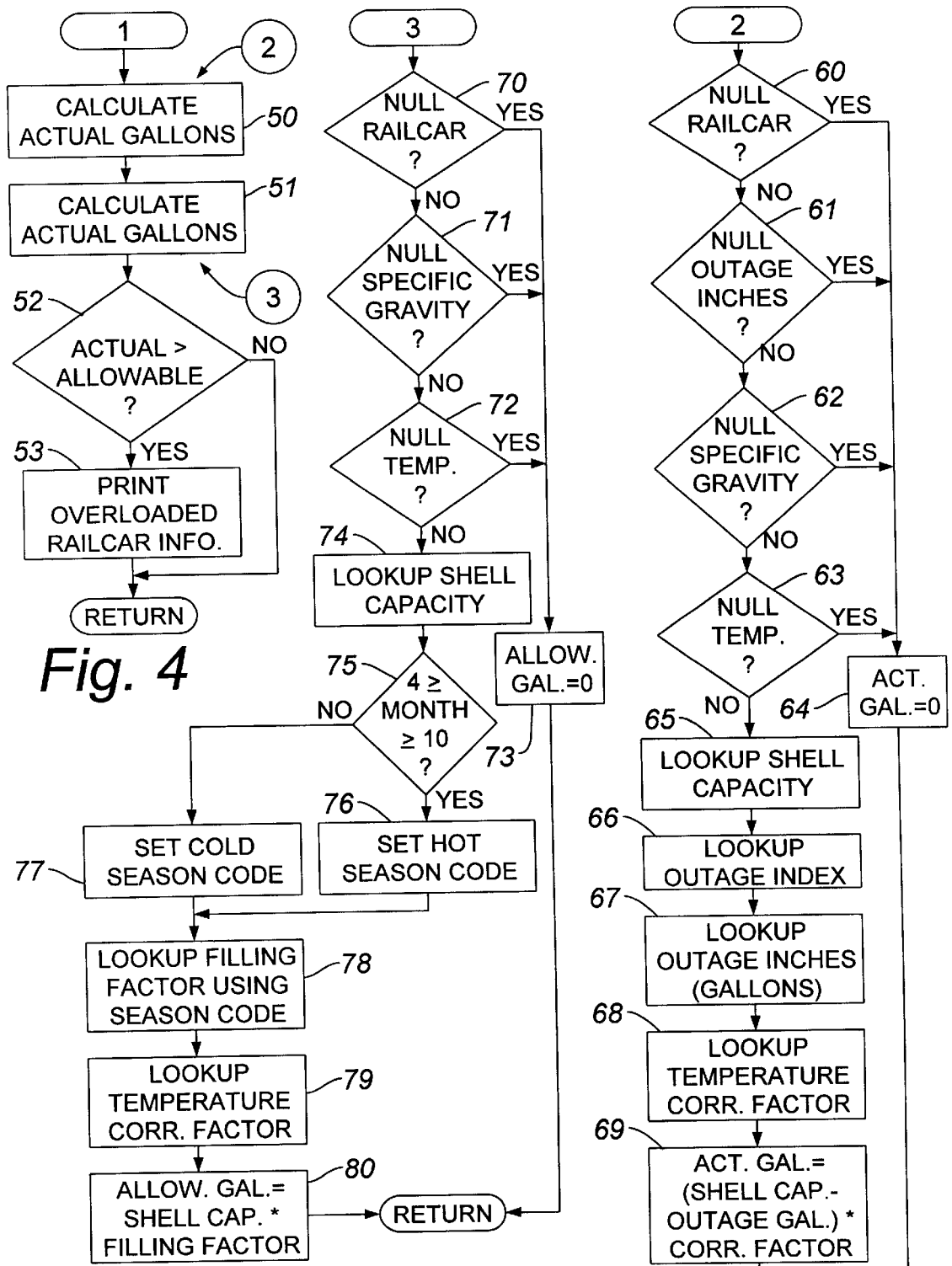
FIG. 4 is a flow diagram of a routine for performing an overload check.
FIG. 5 is a flow diagram of a routine for calculating actual loaded gallons of a liquid commodity.
FIG. 6 is a flow chart of a routine for calculating allowable gallons of a liquid commodity.

A flow diagram of a routine for performing an overload check based on the above factors is shown in FIG. 4. It consists of three steps. First, the actual gallons of the liquid commodity to be shipped are calculated (block 50) as described hereinbelow in FIG. 5. Second, the allowable gallons of the liquid commodity for hauling over the rails are calculated (block 51). Finally, if the actual gallons exceed the allowable gallons (block 52), the overloaded tank car information is printed out (block 53) so that further action can be taken.

A flow diagram of a routine for calculating the actual gallons of the liquid commodity is shown in FIG. 5. Four preliminary checks are performed prior to beginning processing. The railcar (block 60), outage inches (block 61), specific gravity (block 62) and temperature correction factor (block 63) values are checked by table lookup. If any of these values are null, that is, undefined, the actual gallons are set to zero (block 64). Otherwise, the shell capacity is looked up in the database (block 65). Next, the outage index is looked up in the database (block 66) and the corresponding outage inches as expressed in gallons is looked up in the database (block 67). Finally, the temperature correction factor is looked up in the database (block 68). The actual gallons are then calculated (block 69) according to the following equation:

Actual Gallons=(Shell Capacity−Outage Gallons) * Temperature Correction Factor

A flow chart illustrating a routine for calculating the allowable gallons of the liquid commodity is shown in FIG. 6. Three preliminary checks are performed prior to beginning the processing. The railcar (block 70), specific gravity value (block 71) and temperature correction factor (block 72) values are checked. If any of these values are null, the allowable gallons are set to zero (block 73). Otherwise, the shell capacity is looked up in the database (block 74). If the present month is between April and October (block 75), a code indicating a hot season is set (block 76). Otherwise, a code indicating a cold season is set (block 77). The filling factor is looked up using the season code in the database (block 78) and adjusted to correct for seasonal differentials. Finally, the temperature correction factor is looked up in the database (block 79). The allowable gallons are then calculated (block 80) according to the following equation:

Allowable Gallons=Shell Capacity * Filling Factor

If the actual gallons of the loaded liquid commodity do not exceed the allowable gallons(block 52 above, FIG. 4), the loaded car is selected(block 45, FIG.3)and a bill of lading is generated (block 47). An example of a bill of lading generated according to the present invention is shown in FIG. 7.

Figure 8:
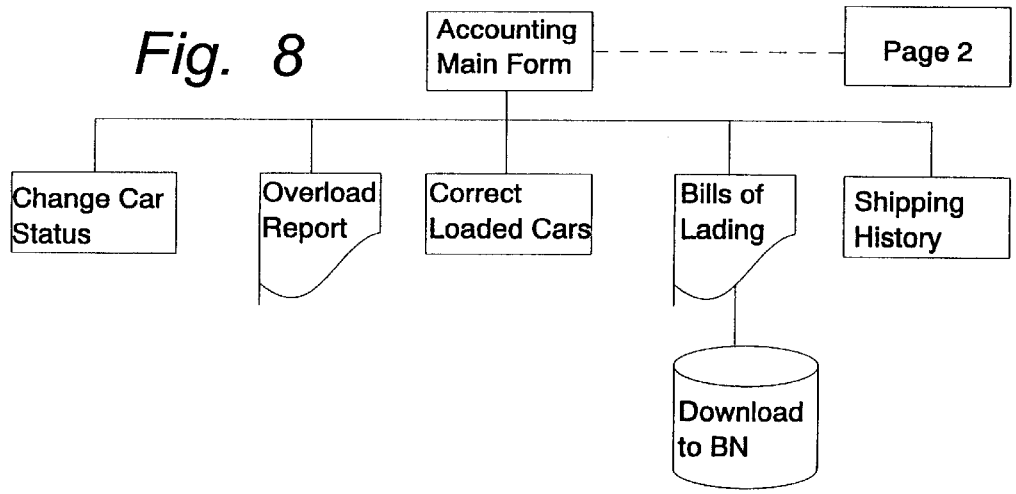
FIG. 8 is an accounting screen hierarchy of the computerized environment of FIG. 1.
Figure 9:
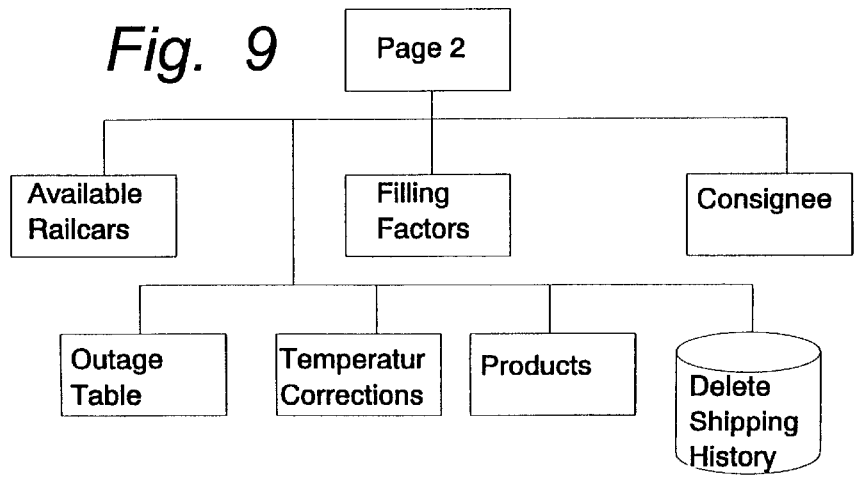
FIG. 9 is a detail block diagram of a portion of the screen hierarchy of FIG. 8.
Figure 10:
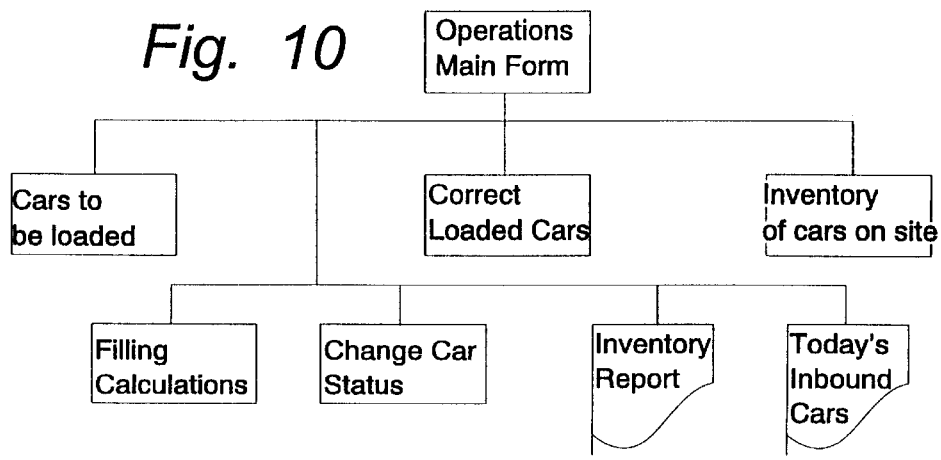
FIG. 10 is an operations screen hierarchy of the computerized environment of FIG. 1.
Figures 11A, 11B:
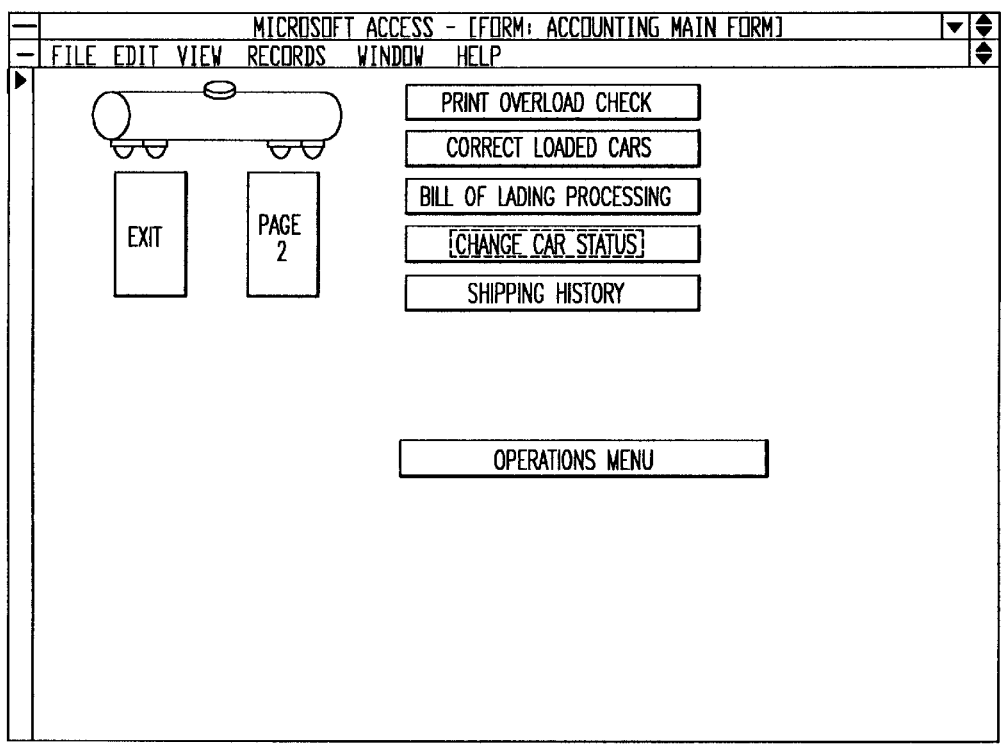
Figures 11E, 11F:
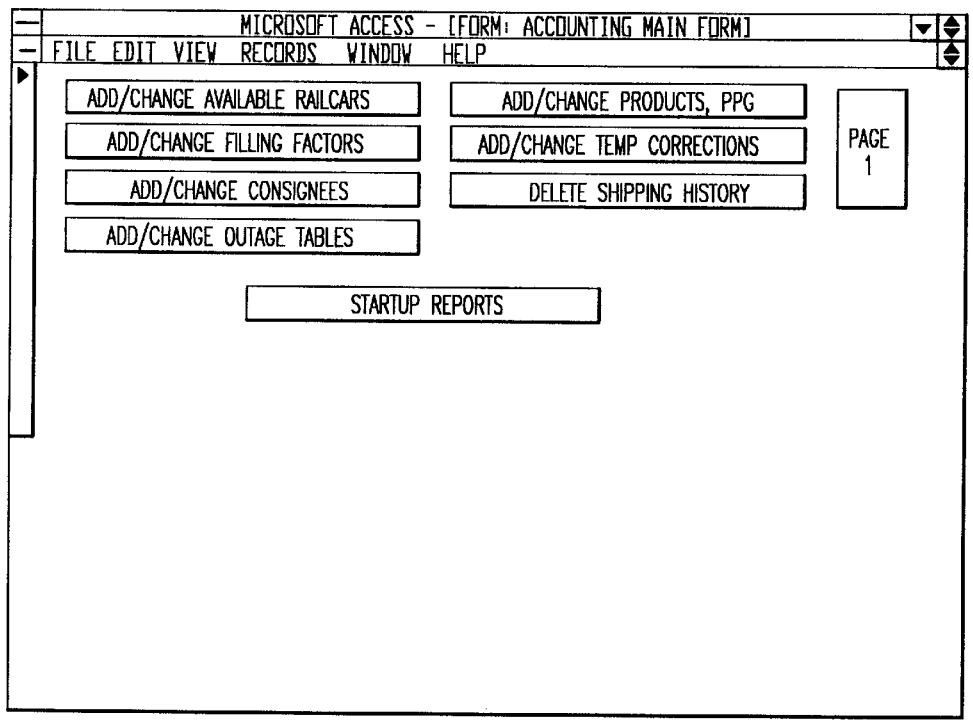
Figure 11K:
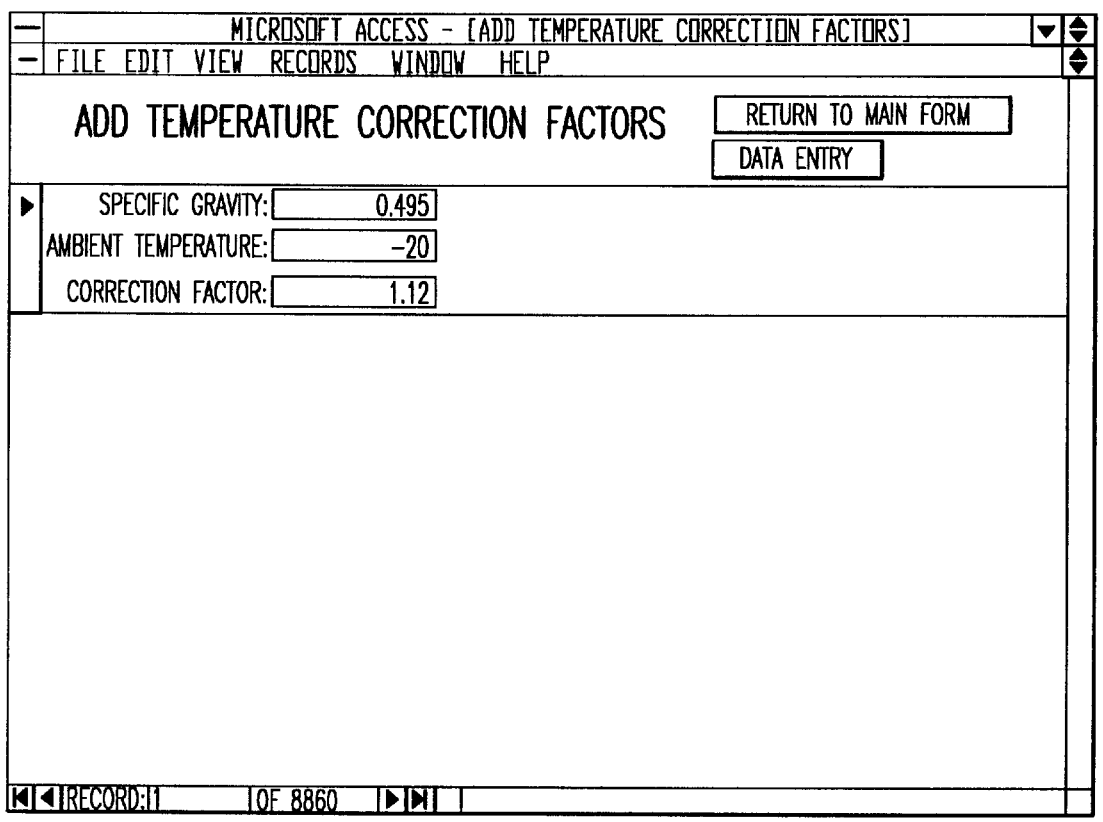
Figures 12A, 12B:
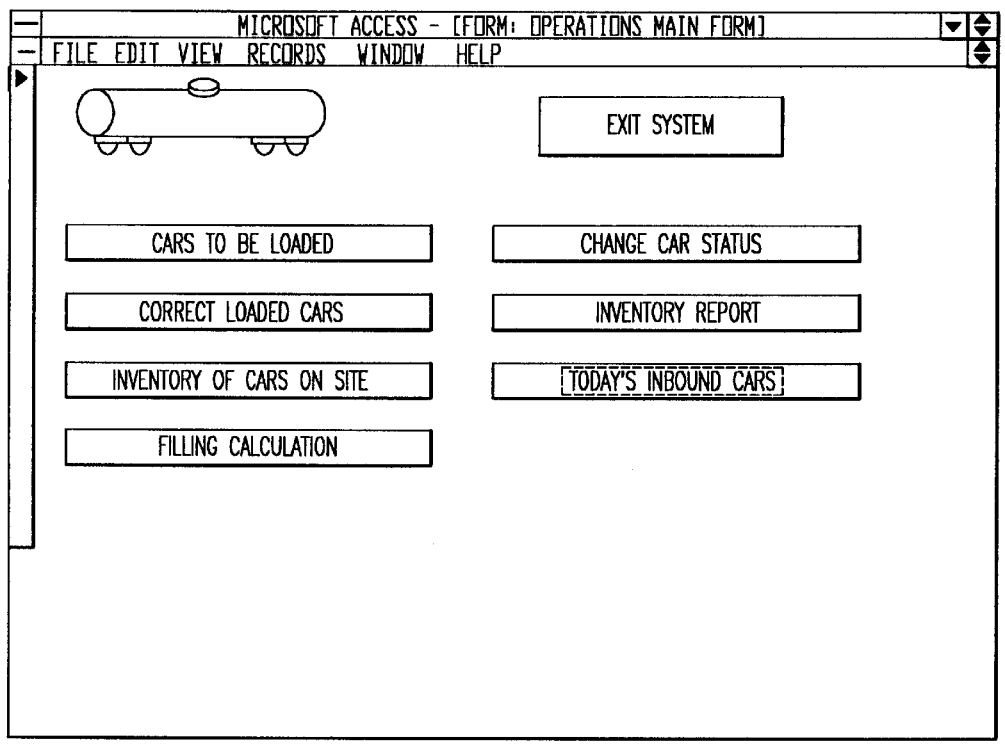

The present invention has been implemented using a relational database management system employing an object-oriented programming language interface. The Operator Screens and Shipping Clerk Screens are listed in Tables 1A and 1B, respectively. The Operator Reports and Shipping Clerk Reports are listed in Tables 2A and 2B, respectively. In addition, a hierarchy describing the interconnection of the screens is provided in FIGS. 8–10. Depictions of the screens and are shown in FIGS. 11(A–K) and 12(A–D). Tables 3A–E depict the available reports. Computer program source code listings are provided in Appendix A. Macros for the screens are summarized in Table 4. Descriptions of the database tables are provided in Table 5.

While the invention has been particularly shown and described as referenced to the embodiments thereof, it will be understood by those skilled in the art that the foregoing and other changes in form and detail may be made without departing from the scope and spirit of the invention.

TABLE 1A

Operator Screens

| | |
|---|---|
| Correct Loaded Cars | Fixes data entry errors |
| Inventory of Cars on Site | Lists all tank cars within boundaries of the refinery |
| Today's Inbound Cars | Lists all tank cars brought into refinery today |
| Filling Calculations | Performs "what if" calculations to determine how full a tank car can be filled without overfilling |
| Overload Check | Flags overloaded tank cars |

TABLE 1B

Shipping Clerk Screens

| | |
|---|---|
| Shipping History | Shows all times that a particular rail car has been used |
| Delete Shipping History | Cleans out old data and reduces file size |
| Add/Change Available Railcars | Reference information |
| Add/Change Filling Factors | Reference information |
| Add/Change Consignee | Reference information |
| Add/Change Outage Tables | Reference information |
| Add/Change Products, PPG | Reference information |
| Add/Change Temperature Correction | Reference information |

TABLE 2A

Operator Reports

| | |
|---|---|
| Inventory Report | Report of all tank cars on site for field verification |

TABLE 2B

Shipping Clerk Reports

| | |
|---|---|
| All Available Cars | Reference information |
| "Unknown" Type Cars | Reference information |
| Filling Factors | Reference information |
| Status | Reference information |
| Outage Tables | Reference information |
| Products, PPG | Reference information |
| Temperature Correction Factors | Reference information |

TABLE 3A

Reports

Overload Check

| Car No. | Allowable Gals Loaded | Actual Net Gallons |
|---|---|---|
| ACFX017322 | 31231 | 30478 |
| ACFX019951 | 31325 | 30787 |
| GATX012113 | 31142 | 30607 |
| GATX019530 | 32329 | 30782 |
| GATX026756 | 32260 | 30606 |
| UTLX037706 | 31433 | 30870 |

Inventory Report

| Location Text | Car No. | Date in Yard | Date Loaded | Product | Car Seal No. | Tank, SV Test Due | Remarks |
|---|---|---|---|---|---|---|---|
| Full, Ready to Ship | | | | | | | |
| | ACFX017322 | 8/3/95 | 8/3/95 | Propane | 11111 | | |
| | ACFX019951 | 8/3/95 | 8/3/95 | Propane | 22222 | | |
| | GATX012113 | 8/3/95 | 8/3/95 | Mixed Butane | 12345 | | |
| | GATX019530 | 8/3/95 | 8/3/95 | Propane | 44444 | | |
| | GATX026756 | 8/3/95 | 8/3/95 | Mixed Butane | 54321 | | |
| | UTLX037706 | 8/3/95 | 8/3/95 | Propane | 55555 | | |

TABLE 3A-continued

Reports

Today's Inbound Cars

| Car No. | Status | Car Type | Tank Test Due | SV Test Due | Remarks |
|---|---|---|---|---|---|
| ACFX017322 | Full, Ready to ship | Propane | | | |
| ACFX019951 | Full, Ready to ship | Propane | | | |
| GATX012113 | Available for use | Propane | | | |
| GATX019530 | Full, Ready to ship | Either/Or | | | |
| GATX026756 | Full, Ready to ship | Butane | | | |
| ROCX005104 | Full, Ready to ship | Either/Or | | | |
| UTLX037706 | Full, Ready to ship | Butane | | | |

TABLE 3B

Waybill 1
Burlington Northern Railroad

From: ARCO PRODUCTS COMPANY  
At: ARCO, WA STATION 66604  
Ship To: TEXACO REFINING  
Care of:  
Rail Dest: FIDALGO WA  
Ult. Dest:  
Route: BN  
Send Freight Bill To:  
A2553

Date: 8/3/95  
BOL Number: 100181  
LP Number: 4094  
Cust Order #

Dely:  
PREPAID  
SECTION 7 SIGNED  
Contract #: BNC67541  
Beyond Contract #:

DESCRIPTION OF ARTICLES:  
LOAD TKR (See Gallons Below)  
FLAMMABLE GAS LIQUIDS  
2.1  
UN1075  
PLACARDED: FLAMMABLE GAS  
EMERGENCY CONTACT: 800-424-9300  
HAZMAT STCC = 4905791 (Propane)  
Canadian ERP: Canadian ERP PHONE:  
AGREEMENT WEIGHTS

| | Outages | | | Gross Ttl. | | S.P. Gravity | | Temp | Shell Cap | Net Gals Shipped | Wt. per |
|---|---|---|---|---|---|---|---|---|---|---|---|
| Init/No. | In. | Gals | Weight | Gals. | Seal No. | At 60F. | Table No. | F. | In Gals. | @60 F. | Gal |
| ACFX017322 | 14 | 2396 | 127012 | 31227 | 11111 | 0.495 | ACFX1413 | 74 | 33623 | 30478 | 4.1674 |
| ACFXO19951 | 14 | 2180 | 128302 | 31544 | 22222 | 0.495 | ACFX1585 | 74 | 33724 | 30787 | 4.1674 |
| GATX012113 | 14 | 2167 | 127553 | 31360 | 33333 | 0.495 | GATX7299 | 74 | 33527 | 30607 | 4.1674 |
| GATX026756 | 14 | 2395 | 127260 | 31288 | 44444 | 0.495 | GATX5289 | 74 | 33683 | 30537 | 4.1674 |
| UTLX037706 | 14 | 2211 | 128647 | 31629 | 55555 | 0.495 | UTLX1181 | 74 | 33840 | 30870 | 4.1674 |

Waybill Comments:  
RETURN EMPTIES TO ARCC PROD CO  
ARCO WA STATION 66604  
This is to certify that the above-nained materials are properly classified, described, packaged, marked and labeled, and are in proper condition for transportation according to the applicable regulations of the department of transportation:  
                                          Bonnie Fredeen  
Burlington Northern STATUS: Created        Date: (YRMODY) Time: (PACIFIC)

TABLE 3C

Waybill 2
Burlington Northern Railroad

From: ARCO PRODUCTS COMPANY  Date: 8/3/95
At: ARCO, WA STATION 66604  BOL Number: 100182
Ship To: CENTENNIAL GAS LIQUIDS  LP Number:
Care of: TEXAS GAS & OIL  Cust Order# 4101
C/O THE MEYERS GROUP
Rail Dest: CALEXICO CA
Ult. Dest:
Route: BN PORTL SP
Send Freight Bill To:  Dely:
CENTENNIAL GAS LIQUIDS  PREPAID
7555 E HAMPDEN AVE STE 51  SECTION 7 SIGNED
DENVER CO 80231  Contract#: BNC67317
  Beyond Contract #:

DESCRIPTION OF ARTICLES:
LOAD TKR (See Gallons Below)
FLAMMABLE GAS LIQUIDS
2.1
UN1075
PLACARDED: FLAMMABLE GAS
EMERGENCY CONTACT: 800-424-9300
HAZMAT STCC = 4905788 (Mixed Butane)
Canadian ERP: Canadian ERP PHONE:
AGREEMENT WEIGHTS

| | Outages | | Gross Ttl. | Seal No. | S.P. Gravity At 60F. | Table No. | Temp F. | Shell Cap In Gals. | Net Gals Shipped @60 F. | Wt. per Gal |
|---|---|---|---|---|---|---|---|---|---|---|
| Init/No. | In. | Gals | Weight Gals. | | | | | | | |
| GATX019530 | 15 | 2404 | 147755 31251 | 12345 | 0.576 | GATX6895 | 74 | 33655 | 30782 | 4.8 |
| RCOX005104 | 15 | 2512 | 146908 31072 | 54321 | 0.576 | ROCX5104 | 74 | 33584 | 30606 | 4.8 |

Waybill Comments:
RETURN EMPTIES TO ARCO PROD CO
ARCC WA STATION 66604
This is to certify that the above-named materials are properly classified, described,
packaged, marked and labeled, and are in proper condition for transportation
according to the applicable regulations of the department of transportation:
  Bonnie Fredeen
Burlington Northern STATUS: Created  Date: (YRMODY) Time: (PACIFIC)

TABLE 4

Macros

| Macro | Description |
|---|---|
| AUTOEXEC | Open accounting main form; check for accounting login ID |
| AUTOEXEC for Cherry Point | Check for accounting login ID |
| Blank out Destination | If carlocation = 2, "6" |
| BOL Processing | Update BOL numbers in Loaded Cars table; delete previous BOL to EDI data; delete previous BOL calcs data; delete previous BOL calcs empties data; append full cars to BOL EDI table; append empty cars to BOL EDI table; append full cars to BOL calcs table; run "Bills of Lading" reports; run "Empty Bills of Lading" reports; export temporary data to comma delimited text file |
| Calculate Overload | Run calculate overload functions |
| Close Form | Close form |
| Create unloaded cars in Loaded Cars table | Open Cars Brought In; open Cars Taken Out; open Cars Brought in by Mistake |
| Data Entry Mode | Go into Data Enty Mode |
| Delete Shipping History | Open and run the Delete query |
| Exit System | Close Active Form |
| Filter_Available Cars | Sort by Car Number; sort by Status |
| Filter_ready_to_ship_cars | Sort by Car Number; sort by Date Loaded |
| Find Car | Find First, Next, Previous, Last |
| Find Car Hist | Find box (whole field) |
| Find Consignee | Go to Consignee name; do "find" function |
| Form_Open Add Car Status form | Close Main Form; open "Add Car Status" form |
| Form_Open Add Cars form | Close Main Form; open "Add Available Railcars" form |
| Form_Open Add Filling Factors form | Close Main Form; open "Add Filling Factors" form |
| Form_Open Add Outages form | Close Main Form; open "Add Outage Table" form |
| Form_Open Add Products form | Close Main Form; open "Add Products" Form |
| Form_Open Add Shipping Clerks form | Close Main Form; open "Add Shipping Clerks" form |
| Form_Open Add Temp Corrections form | Close Main Form; open "Add Temp Corr Factors" form |
| Form_Open Change Car Location form | Close Main Form; open "Change Car Locations" form |
| Form_Open Consignee form | Close Main Form; open "Consignee" form |
| Form_Open Filling Calculations form | Close Main Form; open "Filling Calculations" form |
| Form_Open Find Car | Open "Find Railcars" form |
| Form_Open Loaded Cars form | Close Main Form; open "Cars on-site & Loaded" form |
| Form_Open Not Shipped Cars form | Close Main Form; open "Cars not shipped yet" form |
| Form_Open Ops Inventory | Close Main Form; open "Operations |

TABLE 4-continued

Macros

| Macro | Description |
|---|---|
| form | Inventory" form |
| Form_Open Shipping History form | Close Main Form; open "Shipping History" form |
| Form_Open Startup Reports form | Close Department Menu; open "Startup Reports" form |
| Form_Open To Be Loaded Cars form | Close Main Form; open "Operations Entry" form |
| Future AUTOEXEC | Bring up Accounting or Operations form |
| Go To Page 1 | Go to page 1 |
| Go To Page 2 | Go to page 2 |
| Loaded Cars Update | Update Status, tests and Remarks |
| Logonid_macro | Run code |
| lookup car destination | Lookup car destination |
| lookup car info | Lookup car information |
| lookup car type | Look up car type |
| New Menubar | New menu bar |
| New Menubar_Edit | Undo; undo current record; cut; copy; paste; paste special; paste append; delete; select record; select all records; find; replace; insert object; links |
| New Menubar Edit_Object | Edit object |
| New Menubar_File | Close; save form; save form as; save record; output to; print setup; print preview; print; send; run macro; exit |
| New Menubar_File _Add-ins | |
| New Menubar_File _New | New table; new query; new form; new report; new macro; new module |
| New Menubar_File_Help | Contents; cue cards; technical support; about Microsoft Access |
| New Menubar_Records | Data entry; refresh; edit filter/sort; show all records; allow editing |
| New Menubar_Records_Go To | Go to first; go to last; go to next; go to previous; go to new |
| New Menubar_ Records_Quick Sort | Quick sort ascending; quick sort descending |
| New Menubar_View | Form design; datasheet; subform datasheet; toolbars; options |
| New Menubar_Window | Tile; cascade; arrange icons; hide; unhide; size to fit form |
| Open test To Be Loaded Cars form | Open "Operations Entry" form |
| Operations Update | Set Season Code, Tests Due, Remarks, Status |
| Print the Screen | Print screen shown |
| Report_Open All Available Cars report | Open All Available Cars report |
| Report_Open BN BOL report | Open BN Bill of Lading report |
| Report_Open Car Status | Open "Car Status" report |
| Report_Open Car Tests Due report | Open the BN Bill of Lading Report |
| Report_Open Car Type Unknown report | Open the BN Bill of Lading report |
| Report_Open Filling Factors report | Open Filling Factors report |
| Report_Open Inventory report | Open Inventory report |
| Report_Open Loaded Cars report | Open Loaded Cars report |
| Report_Open Outage Tables | Open "Outage Tables" Report |
| Report_Open Products report | Open Products report |
| Report_Open Temp Correction Factors report | Open Temp Correction Factors report |
| Report_Open Today's Inbound Cars report | Open Today's Inbound Cars report |
| Report_Open Weight Calculations report | Open BN Bill of Lading report |
| Return to Accounting Main | Close current object (form); open main form |
| Return to Acct OR Ops Main Form | Close current object (form); open Acct or Ops Main form depending on Logon ID |
| Return to Dock Super Form | Close current object (form); open main form |
| Return to Operations Main Form | Close current object (form); open main form |
| Return to temp Operations Main Form | Close current object (form); open main form |
| Zold Operations Update | Query Status, Tests and Remarks |

TABLE 5

Database Tables

| Name | Type | Size |
|---|---|---|
| Table: BOL calcs empties | | |
| BOL Number* | Number (Long) | 4 |
| Car Number* | Text | 50 |
| Date shipped | Date/Time | 8 |
| Consignee | Text | 26 |
| Consignee Care of | Text | 26 |
| Consignee Address | Text | 26 |
| Consingee Rail Dest | Text | 14 |
| Consignee State | Text | 2 |
| Hazardous Class | Text | 30 |
| UN/NA | Text | 6 |
| Placarded | Text | 30 |
| Emergency Phone | Number (Double) | 8 |
| Hazmat STCC | Number (Double) | 8 |
| Waybill comment 1 | Text | 30 |
| Waybill comment 2 | Text | 30 |
| Waybill comment 3 | Text | 30 |
| Waybill comment 4 | Text | 30 |
| Waybill comment 5 | Text | 30 |
| Waybill comment 6 | Text | 30 |
| Name | Text | 50 |
| Railroad 1 | Text | 4 |
| Junction 1 | Text | 5 |
| Railroad 2 | Text | 4 |
| Junction 2 | Text | 5 |
| Railroad 3 | Text | 4 |
| Junction 3 | Text | 5 |
| Railroad 4 | Text | 4 |
| Junction 4 | Text | 5 |
| Railroad 5 | Text | 4 |
| Junction 5 | Text | 5 |
| Railroad 6 | Text | 4 |
| Junction 6 | Text | 5 |
| Railroad 7 | Text | 4 |
| Delivey Railroad | Text | 4 |
| Patron Code | Text | 5 |
| Canadian Emerg Resp planCanadian ERP phone | Text | 12 |
| | Number (Double) | 8 |
| Product Name | Text | 50 |
| Ultimate Destination | Text | 14 |
| Ultimate State | Text | 2 |
| Table: BOL Calcs | | |
| BOL Number* | Number (Long) | 4 |
| Car Number* | Text | 50 |
| Date shipped | Date/Time | 8 |
| Shell Capacity | Number (Double) | 8 |
| Weight | Text | 255 |
| Car Seal Number | Text | 50 |
| Outage Index | Text | 50 |
| Outage Inches | Number (Double) | 8 |
| Gallons | Number (Double) | 8 |
| Gross Ttl Gallons | Text | 255 |
| Specific Gravity of Product | Number (Double) | 8 |

TABLE 5-continued

Database Tables

| Name | Type | Size |
|---|---|---|
| Ambient Temperature | Number (Double) | 8 |
| Actual Net Gallons | Text | 255 |
| Pounds Per Gallon | Number (Double) | 8 |
| Product Name | Text | 50 |
| Consignee | Text | 26 |
| Consignee Care of | Text | 26 |
| Consignee Address | Text | 26 |
| Consingee Rail Dest | Text | 14 |
| Consignee State | Text | 2 |
| Ultimate Destination | Text | 14 |
| Ultimate State | Text | 2 |
| LP Number | Number (Double) | 8 |
| Customer Order No | Text | 50 |
| Prepaid or Collect | Text | 2 |
| First Contract No | Text | 10 |
| Second Contract No | Text | 10 |
| Freight Bill to | Text | 26 |
| Freight Bill Address | Text | 26 |
| Freight Bill City | Text | 14 |
| Freight Bill State | Text | 2 |
| Freight Bill Zip | Text | 6 |
| Hazardous Class | Text | 30 |
| UN/NA | Text | 6 |
| Placarded | Text | 30 |
| Emergency Phone | Number (Double) | 8 |
| Hazmat STCC | Number (Double) | 8 |
| Odorized | Yes/No | 1 |
| Waybill comment 1 | Text | 30 |
| Waybill comment 2 | Text | 30 |
| Waybill comment 3 | Text | 30 |
| Waybill comment 4 | Text | 30 |
| Waybill comment 5 | Text | 30 |
| Waybill comment 6 | Text | 30 |
| Name | Text | 50 |
| Railroad 1 | Text | 4 |
| Junction 1 | Text | 5 |
| Railroad 2 | Text | 4 |
| Junction 2 | Text | 5 |
| Railroad 3 | Text | 4 |
| Junction 3 | Text | 5 |
| Railroad 4 | Text | 4 |
| Junction 4 | Text | 5 |
| Railroad 5 | Text | 4 |
| Junction 5 | Text | 5 |
| Railroad 6 | Text | 4 |
| Junction 6 | Text | 5 |
| Railroad 7 | Text | 4 |
| Delivery Railroad | Text | 4 |
| Patron Code | Text | 5 |
| Canadian Emerg Resp plan | Text | 12 |
| Canadian Emergency Phone | Number (Double) | 8 |
| Table: Car Type | | |
| Car Type Index* | Number (Double) | 8 |
| Car Prod Type | Text | 50 |
| Table: Consignee | | |
| Consignee Number* | Number (Long) | 4 |
| Consignee | Text | 26 |
| Consignee Care of | Text | 26 |
| Consignee Address | Text | 26 |
| Consingee Rail Dest | Text | 14 |
| Consignee State | Text | 2 |
| Ultimate Destination | Text | 14 |
| Ultimate State | Text | 2 |
| LP Number | Number (Double) | 8 |
| LP Number 2 | Number (Double) | 8 |
| Rule 1 1 | Yes/No | 1 |
| Customer Order No | Text | 50 |
| First Contract No | Text | 10 |
| Second Contract No | Text | 10 |
| Second Contract RR | Text | 4 |
| Railroad 1 | Text | 4 |
| Junction 1 | Text | 5 |
| Railroad 2 | Text | 4 |
| Junction 2 | Text | 5 |
| Railroad 3 | Text | 4 |
| Junction 3 | Text | 5 |
| Railroad 4 | Text | 4 |
| Junction 4 | Text | 5 |
| Railroad 5 | Text | 4 |
| Junction 5 | Text | 5 |
| Railroad 6 | Text | 4 |
| Junction 6 | Text | 5 |
| Railroad 7 | Text | 4 |
| Delivery Railroad | Text | 4 |
| Prepaid or Collect | Text | 2 |
| Patron Code | Text | 5 |
| Freight Bill to | Text | 26 |
| Freight Bill Address | Text | 26 |
| Freight Bill City | Text | 14 |
| Freight Bill State | Text | 2 |
| Freight Bill Zip | Text | 6 |
| Emergency Phone | Number (Double) | 8 |
| Certifying ID | Text | 8 |
| Waybill comment 1 | Text | 30 |
| Waybill comment 2 | Text | 30 |
| Waybill comment 3 | Text | 30 |
| Waybill comment 4 | Text | 30 |
| Canadian Proper. Shipping Name | Text | 50 |
| Canadian Emergency Phone | Text | 14 |
| Canadian Emerg Resp plan | Text | 12 |
| Canadian ERP phone | Text | 14 |
| Canadian Haz class | Text | 50 |
| Canadian Border Placard | Text | 50 |
| Canadian Haz notation | Text | 50 |
| Consignee Fax number | Number (Double) | 8 |
| Care of Fax number | Number (Double) | 8 |
| Billing dept Fax number | Number (Double) | 8 |
| Blender Fax number | Number (Double) | 8 |
| ARCO LA Fax number | Number (Double) | 8 |
| Odorized with | Text | 50 |
| Table: Filling Factor | | |
| Season Code* | Number (Double) | 8 |
| Specific Gravity* | Number (Double) | 8 |
| Filling Factor | Number (Double) | 8 |
| Table: Last-BOL-Used | | |
| Last BOL* | Number (Long) | 4 |
| Last line item | Number (Double) | 8 |
| Last Consignee | Number (Long) | 4 |
| Last Shipment Date | Date/Time | 8 |
| Last Product | Number (Double) | 8 |
| Last BOL Faxed | Number (Long) | 4 |
| Table: Loaded Cars | | |
| Car Number* | Text | 50 |
| Date loaded* | Date/Time | 8 |
| Date in Yard | Date/Time | 8 |
| Date shipped | Date/Time | 8 |
| Product code | Number (Double) | 8 |
| Outage Index | Text | 50 |
| Outage Inches | Number (Double) | 8 |
| Car Seal Number | Text | 50 |
| Specific Gravity of Product | Number (Double) | 8 |
| Ambient Temperature | Number (Double) | 8 |
| Season Code | Number (Double) | 8 |
| Loaded from Tank | Text | 50 |
| Odorized | Yes/No | 1 |
| Consignee-Destination | Number (integer) | 2 |
| Loading Technician | Text | 50 |
| T test | Number (Double) | 8 |
| SV test | Number (Double) | 8 |
| Shipment Remarks | Text | 50 |
| BOL Number | Number (Long) | 4 |
| Table: Location | | |
| Location Code* | Number (Double) | 8 |
| Location Text | Text | 50 |

TABLE 5-continued

Database Tables

| Name | Type | Size |
|---|---|---|
| Table: Outage | | |
| Outage Index* | Text | 50 |
| Outage Inches* | Number (Double) | 8 |
| Gallons | Number (Double) | 8 |
| Table: Product PPG | | |
| Product Code* | Number (Double) | 8 |
| Product Name | Text | 50 |
| Pounds Per Gallon | Number (Double) | 8 |
| STCC code | Number (Double) | 8 |
| Proper Shipping Name | Text | 25 |
| UN/NA | Text | 6 |
| Hazardous Class | Text | 30 |
| Placarded | Text | 30 |
| Table: Shipping_@Clerks | | |
| LAN-ID* | Text | 50 |
| Name | Text | 50 |
| Phone Number | Number (Long) | 4 |
| Table: Temp BOL to EDI | | |
| Car-initial | Text | 255 |
| Car-Num | Text | 255 |
| BOL Number | Number (Long) | 4 |
| Contract Number | Text | 10 |
| Rule 11 | Text | 1 |
| Second contract | Text | 10 |
| Second contract RR | Text | 4 |
| Consignee | Text | 26 |
| Care of | Text | 26 |
| Address | Text | 26 |
| City | Text | 14 |
| State | Text | 2 |
| Ultimate dest city | Text | 14 |
| Ultimate dest state | Text | 2 |
| Acct of beneficial owner | Text | 26 |
| RR 1 | Text | 4 |
| Jct 1 | Text | 5 |
| RR 2 | Text | 4 |
| Jct 2 | Text | 5 |
| RR 3 | Text | 4 |
| Jct 3 | Text | 5 |
| RR 4 | Text | 4 |
| Jct 4 | Text | 5 |
| RR 5 | Text | 4 |
| Jct 5 | Text | 5 |
| RR 6 | Text | 4 |
| Jct 6 | Text | 5 |
| RR 7 | Text | 4 |
| Switching RR | Text | 4 |
| Prepaid or collect | Text | 2 |
| Patron Code | Text | 5 |
| Freight paid by | Text | 26 |
| Freight address | Text | 26 |
| Freight city | Text | 14 |
| Freight state | Text | 2 |
| Freight zip | Number (Double) | 8 |
| Payer of freight beyong BN | Text | 26 |
| Payer address | Text | 26 |
| Payer city | Text | 14 |
| Payer state | Text | 2 |
| Payer zip | Number (Double) | 8 |
| STCC code | Number (Double) | 8 |
| Commodity desc | Text | 25 |
| Commodity desc 2 | Text | 25 |
| Number of pieces or gals | Number (Double) | 8 |
| Pieces or gals qualifier | Text | 3 |
| Net weight | Number (Double) | 8 |
| Weigh code qualifier | Text | 1 |
| Seals | Text | 15 |
| Special handling code | Text | 3 |
| Comment 1 | Text | 30 |
| Comment 2 | Text | 30 |
| Comment 3 | Text | 30 |
| Comment 4 | Text | 30 |
| Entered by | Text | 26 |
| phone number | Number (Double) | 8 |
| Number of pkgs | Number (Double) | 8 |
| Type of pkg | Text | 2 |
| Quantity in car | Number (Double) | 8 |
| UOM | Text | 2 |
| Haz STCC Code | Number (Double) | 8 |
| Emergency phone | Number (Double) | 8 |
| Un-NA number | Text | 6 |
| Packing group code | Text | 3 |
| Proper shipping name 1 | Text | 25 |
| Proper shipping name 2 | Text | 25 |
| Proper shipping name 3 | Text | 25 |
| Domestic shipment | Text | 1 |
| Primary Haz class | Text | 30 |
| Secondary Haz class | Text | 30 |
| Placarded | Text | 30 |
| Residue Indicator | Text | 1 |
| Certification name | Text | 35 |
| Canadian ERP | Text | 12 |
| Canadian ERP phone | Number (Double) | 8 |
| Ending Comma | Text | 1 |
| Table: Temperature Correction | | |
| Ambient Temperature* | Number (Double) | 8 |
| Specific Gravity* | Number (Double) | 8 |
| Correction Factor | Number (Double) | 8 |
| Table: Available Railcars | | |
| Car Number* | Text | 50 |
| Shelf Capacity | Number (Double) | 8 |
| Outage Index | Text | 50 |
| Car Status | Number (Double) | 8 |
| Tank Test Due | Number (Double) | 8 |
| Safety Valve Test Due | Number (Double) | 8 |
| Car Owner | Text | 50 |
| Date Entered | Date/Time | 8 |
| Car Product Type | Number (Double) | 8 |
| Remarks | Text | 50 |
| Last Destination | Number (integer) | 2 |
| Last Product | Number (Double) | 8 |

*Indexing fields

Appendix A

-31-

```
'------------------------------------------------------------------------
'
' MODULE
'
'    Settings
'
' PURPOSE
'
'    Provides routines for manipulating the Settings table.
'
'------------------------------------------------------------------------

Option Compare Text     'Make string comparisons case insensitive

Function BOLFaxed ()
    Dim db As Database
    Dim t As Dynaset

Set db = CurrentDB()
    Set t = db.CreateDynaset("Last_BOL_Used")

t.MoveFirst
    numfax = t.[Last BOL faxed]

Do
        t.Edit
        t.[Last BOL faxed] = t.[Last BOL faxed] + 1
        t.Update
        DoCmd OpenReport "Bills of Lading", A_NORMAL, "Check Faxed"
        DoCmd Close A_REPORT, "Bills of Lading"

Loop Until t.[Last BOL faxed] = t.[Last BOL]

BOLFaxed = t.[Last BOL faxed]

t.Close

End Function
'------------------------------------------------------------------------
' FUNCTION      : IncrementBOLNumber
'
' PURPOSE       : Retrieves and increments the Last BOL Number from the Consig
nee table
'------------------------------------------------------------------------
Function IncrementBOLNumber (ByVal Cons As Integer, ByVal Sdte As Variant, ByV
al Prod As Integer) As Long
    Dim db As Database
    Dim t As Dynaset Set db = CurrentDB()
    Set t = db.CreateDynaset("Last_BOL_Used")

t.MoveFirst
    num = t.[Last BOL]
    ln = t.[Last Line Item]
    LCons = t.[Last Consignee]
    LSdte = t.[Last Shipment Date]
    LProd = t.[Last Product]

If Cons <> LCons Then
        t.Edit
```

```
            t.[Last BOL] = t.[Last BOL] + 1
            t.[Last Line Item] = 1
            t.[Last Consignee] = Cons
            t.[Last Shipment Date] = CVDate(Sdte)
            t.[Last Product] = Prod
            t.Update
    ElseIf Prod <> LProd Then
            t.Edit
            t.[Last BOL] = t.[Last BOL] + 1
            t.[Last Line Item] = 1
            t.[Last Shipment Date] = CVDate(Sdte)
            t.[Last Product] = Prod
            t.Update
    ElseIf Sdte <> LSdte Then
            t.Edit
            t.[Last BOL] = t.[Last BOL] + 1
            t.[Last Line Item] = 1
            t.[Last Shipment Date] = CVDate(Sdte)
            t.[Last Product] = Prod
            t.Update
    ElseIf ln = 6 Then
            t.Edit
            t.[Last BOL] = t.[Last BOL] + 1
            t.[Last Line Item] = 1
            t.Update
    Else
            t.Edit
            t.[Last Line Item] = t.[Last Line Item] + 1
            t.Update
    End If IncrementBOLNumber = t.[Last BOL]

t.Close

End Function
```

```
Option Compare Database    'Use database order for string comparisons

Function Actual (ByVal car As String, ByVal OutInch As Double, ByVal grav As D
ouble, ByVal temp As Double) As Integer
    If (IsNull(car)) Then
        Actual = 0
        Exit Function
    ElseIf (IsNull(OutInch)) Then
        Actual = 0
        Exit Function
    ElseIf (IsNull(grav)) Then
        Actual = 0
        Exit Function
    ElseIf (IsNull(temp)) Then
        Actual = 0
        Exit Function
    End If 'Purpose:   Look up shell capacity for the car
    StWhere$ = "([Car Number]='" + Format$(car) + "')"
    Capacity = DLookup("[Shell Capacity]", "[Available Railcars]", StWhere$)

'Purpose:   Look up outage index for the car
    StWhere$ = "([Car Number]='" + Format$(car) + "')"
    OIndex = DLookup("[Outage Index]", "[Available Railcars]", StWhere$)

'Purpose:   Look up Outage Inches
    StWhere$ = "(([Outage Index]='" + Format$(OIndex) + "') AND "
    StWhere$ = StWhere$ + "([Outage Inches] =" + Format$(OutInch) + "))"
    galls = DLookup("[Gallons]", "[Outage]", StWhere$)

'Purpose:   Look up Temperature Correction Factor
    StWhere$ = "(([Ambient Temperature]=" + Format$(temp) + ") AND "
    StWhere$ = StWhere$ + "([Specific Gravity] =" + Format$(grav) + "))"

CFact = DLookup("[Correction Factor]", "[Temperature Correction]", StWhere
$)

'Purpose:   Do the final calculation
    Actual = Format((Capacity - galls) * CFact, "#")

End Function

Function Allowable (ByVal car As String, ByVal grav As Double, ByVal temp As I
nteger) As Integer
    If (IsNull(car)) Then
        Allowable = 0
        Exit Function
    ElseIf (IsNull(grav)) Then
        Allowable = 0
        Exit Function
    ElseIf (IsNull(temp)) Then
        Allowable = 0
        Exit Function
    End If 'Purpose:   Look up shell capacity for the car
    StWhere$ = "([Car Number]='" + Format$(car) + "')"
    Capacity = DLookup("[Shell Capacity]", "[Available Railcars]", StWhere$)

'Purpose:   Look up Filling Factor
    If Month(Now) >= 4 And Month(Now) <= 10 Then
        SC = 2
    Else
```

```
        SC = 1
    End If

StWhere$ = "(([Season Code]=" + Format$(SC) + ") AND "
    StWhere$ = StWhere$ + "([Specific Gravity] =" + Format$(grav) + "))"

FFact = DLookup("[Filling Factor]", "[Filling Factor]", StWhere$)

'Purpose:   Look up Temperature Correction Factor
    StWhere$ = "(([Ambient Temperature]=" + Format$(temp) + ") AND "
    StWhere$ = StWhere$ + "([Specific Gravity] =" + Format$(grav) + "))"

CFact = DLookup("[Correction Factor]", "[Temperature Correction]", StWhere
$)

'Purpose:   Do the final calculation
    Allowable = Format((Capacity * FFact) / CFact, "#")

End Function
```

```
Option Compare Database    'Use database order for string comparisons

Function FindRailcar (ByVal Direction As String) As Variant

' Purpose: Finds a railcar using the parameters set in the
    '          Find railcar form.
    ' Accepts: Direction - a string that identifies in which direction the
    '                      search should take place:
    '                           First    - the first railcar that matches
    '                           Last     - the last railcar that matches
    '                           Next     - the next railcar that matches
    '                           Previous - the previous railcar that matches
    '                      Next and previous are relative to the current
    '                      record position.
    '
    ' Returns: Null  - Invalid arguments were passed or used.
    '          False - No matching record was found.
    '          True  - A matching record was found.
    ' Revision History
    ' ---------------------------------------------------------------------
    ' 1.00  15-Mar-93 Chris St. Valentine
    '                 Initial version.
    '        19-May-94 Tricia Morell
    '                 Customized for Railcar system
    ' ---------------------------------------------------------------------
    Const TITLEBAR = "Find Railcar"
    Dim MyForm As Form, MySet As Dynaset
    Dim Msg As String, X As Integer, Criterion As String
    Dim SearchString As String, SearchField As String
    Dim Quote As String Quote = Chr$(34)
    On Error Resume Next
    Set MySet = Forms![Change Railcar Location].Dynaset
    If Err Then
        On Error GoTo 0
        Msg = "You must open the Change Railcar Status form before you can fin
d a railcar."
        MsgBox Msg, MB_ICONINFORMATION, TITLEBAR
        FindRailcar = Null
        Exit Function
    End If
    On Error GoTo 0

Set MyForm = Forms![Find Railcars]
    X = (InStr(1, "First   Last    PreviousNext    ", Direction, CASEINSENSITI
VE) + 7) \ 8

If X = 0 Then
        Msg = "Invalid direction argument."
        MsgBox Msg, MB_ICONEXCLAMATION, "FindRailcar"
        FindRailcar = Null
        Exit Function
    End If SearchString = LCase(MyForm![Search String])     ' Search for what?
    SearchField = "Car Number"

Select Case MyForm![Search Where Group]          ' Search how?
        Case 1 ' Beginning of field.
            Criterion = "LCase(Left([" & SearchField & "], " & Len(SearchStri
ng) & ")) = '" & SearchString & "'"
```

```
        Case 2 ' Anywhere in field.
            Criterion = "Instr(1, [" & SearchField & "], " & Quote & SearchSt
ring & Quote & ", " & CASEINSENSITIVE & ") <> 0"
        Case 3 ' Exact match.
            Criterion = "[" & SearchField & "] = " & SearchString
        Case Else
            Msg = "Invalid Search Where option."
            MsgBox Msg, MB_ICONEXCLAMATION, "FindRailcar"
            FindRailcar = Null
            Exit Function
    End Select Select Case LCase(Direction)
        Case "first"
            MySet.FindFirst Criterion
        Case "next"
            MySet.FindNext Criterion
        Case "last"
            MySet.FindLast Criterion
        Case "previous"
            MySet.FindPrevious Criterion
    End Select If MySet.NoMatch Then
        Msg = "Couldn't find a " & LCase(Direction) & " railcar with '"
        Msg = Msg & SearchString & "' in the " & SearchField & " field."
        MsgBox Msg, MB_ICONINFORMATION, TITLEBAR
        FindRailcar = False
    Else
        Forms![Change Railcar Location].Bookmark = MySet.Bookmark
'         DoCmd MoveSize , 6200
        FindRailcar = True
    End If End Function
```

```
Option Compare Database    'Use database order for string comparisons

Dim Clerks As Table
Global UPdatesok As String
Global Logonid As String
Global Counter As Integer
Global EnvString As String
Global LenLogon As Integer Function Accounting_Logins ()
'Get Environment variable net_name
'Use it to open a specified form Counter = 1      ' Initialize Counter to 1

Do
        EnvString$ = Environ$(Counter)     ' Get environment variable.
        If Left(EnvString$, 9) = "NET_NAME=" Then      ' Get network name.
            LenLogon = (Len(EnvString$) - 9)
            Logonid = Right(EnvString$, LenLogon)
            Exit Do
        Else
            Counter = Counter + 1 ' Not NET_NAME entry, so increment.
        End If
    Loop Until EnvString$ = ""

'Purpose:   Check logon id against network id to see if updates are
'           permissible Dim varLogin As String
    Dim varRetVal As Variant
    Dim varIndexKey As Variant
    Dim dbCurrent As Database
    Dim Clerks As Table Set dbCurrent = CurrentDB()
    Set Clerks = dbCurrent.OpenTable("Shipping_Clerks")

Clerks.MoveFirst

'Use transaction processing to improve speed
    BeginTrans
        Do While Not Clerks.EOF
            'Set the value of the key for which you are testing
            varIndexKey = Clerks.Lan_id
            varLogin = Clerks.Lan_id
            If Logonid = varLogin Then
                UPdatesok = "yes"
                Exit Do
                Else UPdatesok = "no"
                End If 'Move to the next id  to see if it's ok to update
            Clerks.MoveNext 'You need the following test to prevent "No current record" messag
es
            If Clerks.EOF Then
                Exit Do
            End If
```

```
    Loop

If UPdatesok = "yes" Then
    DoCmd OpenForm "Accounting Main form"
  Else
    DoCmd OpenForm "Operations Main form"
  End If ' CommitTrans
    Exit Function OpsError:
    Rollback
    MsgBox Error$, 16, "Operations Error"
    Exit Function End Function Function Logonid_module ()

Counter = 1      ' Initialize Counter to 1.

Do
        EnvString$ = Environ$(Counter)     ' Get environment variable.
        If Left(EnvString$, 9) = "NET_NAME=" Then      ' Get network name.
            LenLogon = (Len(EnvString$) - 9)
            Logonid = Right(EnvString$, LenLogon)
            Exit Do
        Else
            Counter = Counter + 1 ' Not NET_NAME entry, so increment.
        End If
    Loop Until EnvString$ = ""
    Logonid_module = Logonid End Function
```

```
'----------------------------------------------------------------------
'
' MODULE
'
'    Tool Palette Routines
'
' PURPOSE
'
'    Provides routines for manipulating the custom Tool Palette
'    used by ORDENTRY.MDB.
'
' NOTES
'
'    Requires the module 'Windows API Routines'.
'
'----------------------------------------------------------------------
Option Compare Database    'Use database order for string comparisons '
' Set up a variable to store whether or not the toolbar was
' up when FieldOrder.MDB was opened so that we can restore it
' later if necessary.
'
Global gfToolbar As Integer '----------------------------------------------------------------------
' FUNCTION    : HideToolbar
'
' PURPOSE     : Hides the Microsoft Access toolbar.
'----------------------------------------------------------------------
Function HideToolbar () As Integer
    SendKeys "%VO{Down 3}N{ENTER}", True
    HideToolbar = True
End Function '----------------------------------------------------------------------
' FUNCTION    : ShowToolbar
'
' PURPOSE     : Turns the toolbar back on.
'----------------------------------------------------------------------
Function ShowToolbar () As Integer
    SendKeys "%VO{Down 3}Y{ENTER}", True
    ShowToolbar = True
End Function '----------------------------------------------------------------------
' FUNCTION    : FToolbarWasUp
'
' PURPOSE     : Returns True if the toolbar was up when FieldOrder.MDB
'               was first started.
'----------------------------------------------------------------------
Function ToolbarWasUp () As Integer
    ToolbarWasUp = gfToolbar
End Function '----------------------------------------------------------------------
' FUNCTION    : TPCriteria
'
' PURPOSE     : Function that is called when the user clicks the
'               Criteria button in the custom Tool Palette.
'----------------------------------------------------------------------
Function TPCriteria () As Integer
```

What is claimed is:

1. A method using a computer for generating a bill of lading describing a liquid commodity shipment, the computer comprising temporal logic and a database for storing shipment container attributes and liquid commodity factors, comprising the steps of:

loading a liquid commodity into a transportable shipment container up to a predetermined inside height of the shipment container for hauling over a regulated transportation surface;

determining volumetric units of the liquid commodity actually loaded into the shipment container based on the predetermined inside height, the stored container attributes corresponding to the shipment container attributes corresponding to the shipment container and the stored liquid commodity factors;

automatically correcting at least one of the corresponding stored container attributes to adjust for seasonal differentials using the temporal logic;

determining volumetric units of the liquid commodity allowable over the transportation surface based on the corresponding stored container attributes, the stored commodity factors and the corrected container attribute;

comparing the actual volumetric units to the allowable volumetric units; and generating a bill of lading for the liquid commodity shipment using output means when the actual volumetric units do not exceed the allowable volumetric units.

2. A method according to claim 1, wherein each of the stored shipment container attributes comprises a capacity for a shipment container and corresponding outage volumetric units for the difference between the capacity and the predetermined inside height measured in volumetric units and each of the stored liquid commodity factors comprise a temperature correction factor.

3. A method according to claim 2, wherein the actual volumetric units equals the difference of a capacity less the corresponding outage volumetric units multiplied by a temperature correction factor.

4. A method according to claim 1, wherein each of the stored shipment container attributes comprises a capacity for a shipment container and each of the stored liquid commodity factors comprises a temperature correction factor and an unadjusted filling factor.

5. A method according to claim 4, wherein the step of automatically correcting further comprises adjusting an unadjusted filling factor and the allowable volumetric units equals the product of a capacity times an adjusted filling factor divided by a temperature correction factor.

6. A method according to claim 1, wherein each of the stored shipment container attributes comprises a safety indicator for representing a status of a safety inspection, the method further comprising the steps of:

setting the safety indicator when the shipment container is due through the current year for at least one of a tank integrity test or a safety valve test; and prior to the step of loading, selecting a shipment container with a safety indicator that is not set.

7. A method according to claim 1, wherein the temporal logic comprises a clock/calendar logic circuit for maintaining an internal time/date clock.

8. A method according to claim 1, wherein the output means comprises at least one of means for printing the bill of lading according to a customer number and a product description or means for creating a flat computer file for tabularly representing the bill of lading and transmitting the flat computer file to another computer.

9. A method according to claim 8, wherein the database further comprises consignee information for identifying a recipient of the commodity shipment, the step of generating the bill of lading further comprising generating the consignee information.

10. A method according to claim 8, wherein the database further comprises data corresponding to the shipment container representing a seal number and remarks, the step of generating the bill of lading further comprising using the data for generating the seal number and remarks.

11. A method according to claim 1, wherein the shipment container comprises a railroad tank car and the regulated transportation surface comprises a railroad track.

* * * * *